3,264,316
CERTAIN 2-ACYLIMINO-3-SUBSTITUTED-
THIAZOLINE-4 COMPOUNDS
Cornelis Van De Westeringh, Breda, Netherlands, and
Alfons Herman Margaretha Raeymaekers, Beerse, near
Turnhout, Belgium, assignors to Research Laboratorium Dr. C. Janssen N.V., a corporation of Belgium
No Drawing. Filed Sept. 18, 1963, Ser. No. 309,854
17 Claims. (Cl. 260—306.7)

This invention relates to new chemical compounds and, generally, to new derivatives of 2-imino-thiazoline. More specifically, the invention pertains to 2-imino-thiazoline derivatives having the formula:

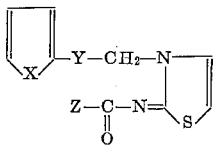

wherein X is selected from the group consisting of oxygen and sulfur atoms, preferably sulfur; Y is selected from the group consisting of —CO—, —CH(DH)— and —CH(O—CO—lower alkyl)— radicals, preferably

—CH(OH)— and Z is selected from the group consisting of lower alkyl, cyclopropyl and lower alkoxy radicals, preferably methyl or ethyl. The therapeutically active non-toxic acid addition salts of the foregoing compounds are also embraced within the scope of this invention. The subject novel compounds are useful as parasiticides and have been found to be particularly effective against the intestinal parasites Ascaris and Heterakis.

Lower alkyl and lower alkoxy groups are those containing from 1 to 6 carbon atoms including straight or branched saturated aliphatic chains, e.g., methyl, ethyl, propyl, isopropyl, n-butyl, isobutyl, pentyl, isopentyl, hexyl, etc. and the corresponding oxy aliphatic groups, e.g., methoxy, ethoxy, propoxy, etc.

The compounds of this invention, wherein Y is a carbonyl (—CO—) group and Z is a lower alkyl or cyclopropyl radical, may be prepared by the acylation of the corresponding 2-imino-3-[(2-thienyl-carbonyl)-methyl]-thiazoline or 2-imino-3-[(2-furyl-carbonyl)-methyl]thiazoline, or the hydrohalide, e.g. hydrobromide and hydrochloride, salts thereof. The reaction may be carried out by heating these compounds, preferably under reflux conditions, with an appropriate acylating agent such as the anhydride of a lower aliphatic acid, e.g., acetic anhydride, propionic anhydride, n-butyric anhydride, isobutyric anhydride, valeric anhydride, caproic anhydride and the like. Acyl halides may also be used advantageously as the acylating agent, e.g., lower aliphatic acid halides such as acetyl chloride, butyryl chloride, isobutyryl chloride, valeryl chloride and the like, and cyclopropyl carboxylic acid halides such as cyclopropyl carboxylic acid chloride.

2-imino-3-[(2-thienyl carbonyl)-methyl]-thiazoline may be prepared by heating together for a suitable time 2-imino-thiazoline and a halomethyl-2-thienyl-ketone, e.g., bromomethyl- or chloromethyl-2-thienyl-ketone. On cooling, the corresponding 2-imino-3-[(2-thienyl-carbonyl)-methyl]-thiazoline hydrohalide precipitates, from which the free base may be readily liberated according to conventional means, such as by treatment with an alkali hydroxide. In a similar manner, except that a halomethyl-2-furyl-ketone is substituted for the 2-thienyl-ketone above, 2-imino-3-[(2-furyl-carbonyl)-methyl]-thiazoline may be prepared.

Compounds wherein Y is —CO— and Z is lower alkoxy may be prepared by reacting 2-imino-3-[(2-thienyl-carbonyl)-methyl]-thiazoline or 2-imino-3-[(2-furyl-carbonyl)-methyl]-thiazoline or, preferably, the hydrohalide salts thereof such as the hydrochloride or hydrobromide, with a lower alkyl-haloformate, e.g., methyl-chloroformate, ethyl-chloroformate, propyl-chloroformate, etc. in an inert organic solvent, e.g., chloroform, benzene, carbon tetrachloride, ether and the like, under, preferably, reflux conditions.

When the hydrohalide salts of 2-imino-3-[(2-thienyl-carbonyl)methyl]-thiazoline and 2-imino-3-[(2-furyl-carbonyl)-methyl]-thiazoline are used in the foregoing reactions with lower aliphatic acid halides, cyclopropyl carboxylic acid halides and lower alkyl-haloformates, the progress of the reaction is generally enhanced by the presence of a halogen acid acceptor, that is, a compound which may be added to the reaction mixture to combine or react with the halogen acid that is formed or released during the progress of the reaction. The preferred halogen acid acceptors that are operable herein are organic liquids having a tertiary amine-like structure such as, for example, trialkyl amines, e.g., triethyl amine, tributyl amine, etc.; heterocyclic amines, e.g., N-alkyl piperidine, N-alkyl morpholine, pyridine, butidine, quinoline, etc.; and dialkyl aromatic amines, e.g., diethyl aniline, dimethyl aniline, etc. The amount of halogen acid acceptor that may be employed is not critical, but, for optimum conditions, the theoretical number of moles of halogen acid liberated during the course of the reaction can easily be calculated from the quantities of reactants employed and, thus, the corresponding amount of halogen acid acceptor that need be employed can readily be determined. The halogen acid acceptor need not be soluble in the reaction solvent, and, in some instances, the halogen acid acceptor may advantageously serve as the solvent also.

Alternatively, the subject compounds, wherein Y is —CO—, may be prepared by the interaction of a halomethyl-2-thienyl-ketone or a halomethyl-2-furyl-ketone, such as bromomethyl-2-thienyl-ketone and bromomethyl-2-furyl-ketone, with a 2-(Z-CO-amino)-thiazole [resonant form: 2-(Z-CO-imino)-thiazoline], wherein Z has the previously described values. The reaction is conveniently carried out at elevated temperatures of about 100–150° C., under pressure, and in a dry inert organic solvent, for example, aromatic hydrocarbons such as toluene, benzene, xylene and the like; aliphatic alcohols such as methanol, ethanol and the like; and aliphatic ketones such as acetone, butanone, 4-methyl-2-pentanone and the like. The starting 2-(Z-CO-amino)-thiazoles may be readily obtained by treating 2-amino-thiazole (resonant form: 2-imino-thiazoline) with an acylating agent or a lower alkyl-haloformate as previously described for the interactions with 2-imino-3-[(2-thienyl-carbonyl)-methyl]-thiazoline and 2-imino-3-[(2-furyl-carbonyl)-methyl]-thiazoline.

The compounds of this invention, wherein Y is a —CO— group, may be reduced to the corresponding compounds wherein Y is a —CH(OH)— group with reducing agents such as the alkali metal borohydrides, e.g., lithium, potassium or sodium borohydride. These reducing agents may be employed in the presence of suitable organic solvents such as ethers, e.g., diethylether, diethyleneglycol, dimethylether, tetrahydrofuran or dioxane, and aliphatic alcohols, e.g., methanol, ethanol, 2-propanol or 2-butanol. The resulting compounds, depending on whether X in the above formula is sulfur or oxygen, may be denoted as 2-(Z-CO-imino)-3-[2-hydroxy-2-(2-thienyl)-ethyl]-thiazoline and 2-(Z-CO-imino)-3-[2-hydroxy-2-(2-furyl)-ethyl]-thiazoline, respectively.

Acylation of these latter compounds, wherein Y is a —CH(OH)— group, with an acylating agent such as the previously described lower aliphatic acid anhydrides affords the corresponding novel compounds of this invention wherein Y is a —CH(O—CO—lower alkyl)— group. These compounds may be denoted as 2-(Z-CO-imino) - 3 - [2 - (lower alkyl - carbonyl - oxy) - 2 - (2-thienyl) - ethyl] - thiazoline and 2 - (Z - CO - imino)-3 - [2 - (lower alkyl - carbonyl - oxy) - 2 - (2 - furyl)-ethyl]-thiazoline, respectively, depending again on the value of X (i.e., sulfur or oxygen). Alternatively, if it is desired to have the Z and lower alkyl radicals in these compounds identical, one may acylate the corresponding 2 - imino - 3 - [2 - hydroxy - 2 - (2 - thienyl) - ethyl]-thiazoline and 2 - imino - 3 - [2 - hydroxy - 2 - (2 - furyl)-ethyl]-thiazoline compounds, respectively, with an acylating agent such as a lower aliphatic acid anhydride, or a lower aliphatic acid halide. Said 2-imino-3-[2-hydroxy - 2 - (2 - thienyl) - ethyl] - thiazoline and 2-imino - 3 - [2 - hydroxy - 2 - (2 - furyl) - ethyl] - thiazoline compounds are obtained by the alkali metal borohydride reduction of the respective 2-imino-3-[(2-thienyl-carbonyl) - methyl] - thiazoline and 2 - imino - 3 - [(2-furyl-carbonyl)-methyl]-thiazoline compounds.

The subject compounds are isolated as the free bases by the synthetic processes normally employed. These compounds, in base form, are convertible to therapeutically active non-toxic acid addition salts by treatment with an appropriate acid, such as, for example, an inorganic acid such as hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid. Of the foregoing typical salts, the hydrochloride is preferred.

The acylation reactions described herein may be carried out in a variety of nonhydroxylic solvents such as benzene, chloroform, methylene chloride, tetrahydrofuran, diethylether, etc.

The invention may be illustrated by, although not limited to, the following examples. All parts are by weight.

*Example I*

A mixture of 4 parts of 2-imino-thiazoline, 8.3 parts of bromo-methyl-2-thienyl-ketone and 40 parts of absolute ethanol is stirred and refluxed for 2 hours in a waterbath. After cooling, the precipitated hydrobromide is filtered off. From this salt the free base is liberated on treating with ammonium hydroxide solution and it is extracted with chloroform. The organic extract is separated, treated with activated charcoal, filtered and the filtrate is first dried over magnesium sulfate and then evaporated. The solid residue is recrystallized from 24 parts 2-propanol, to yield 2-imino-3-[(2-thienyl-carbonyl)-methyl]-thiazoline; M.P. 117.5–118.5° C.

*Example II*

A mixture of 12 parts of 2-imino-thiazole, 23.5 parts of 1-bromo-2-(2-furyl)-2-oxo-ethane and 160 parts of 2-propanol is stirred while heating in an oil-bath for 15 minutes at 100° C. After cooling, the formed precipitate is filtered off and dried in vacuo, yielding 3-[(2-furyl-carbonyl)-methyl]-2-imino - thiazoline hydrobromide; M.P. 198–198.5° C.

*Example III*

A mixture of 4 parts of 2-imino-3-[(2-thienyl-carbonyl)-methyl]-thiazoline, 50 parts of acetic acid anhydride and 1.15 parts of sodium acetate is stirred and refluxed for 15 minutes. The formed sodium bromide is filtered off. From the filtrate, the excess of acetic acid anhydride is distilled and the residual solid is recrystallized from 2-propanol. The solid is filtered off and dried in vacuo, yielding 2-(acetyl-imino)-3-[(2-thienyl-carbonyl)-methyl]-thiazoline; M.P. 146–147.5° C.

*Example IV*

A mixture of 55 parts of 3-[(2-furyl-carbonyl)-methyl]-2-imino-thiazoline hydrobromide, 300 parts of acetic acid anhydride and 25 parts of sodium acetate is stirred and refluxed for 15 minutes. The excess acetic acid anhydride is evaporated. The solid residue is alkalized with ammonium hydroxide and extracted with chloroform. The whole is boiled with activated charcoal, filtered and the filtrate is evaporated. The solid residue is recrystallized from 160 parts of 4-methyl-2-pentanone. The solid is filtered off and dried, yielding 2-(acetyl-imino)-3-[(2-furyl-carbonyl)-methyl]-thiazoline; M.P. 142.5–143.5° C.

*Example V*

To a stirred solution of 5 parts of 2-imino-3-[(2-thienyl-carbonyl)-methyl]-thiazoline hydrobromide and 3 parts of triethylamine in 220 parts of chloroform are added 3.2 parts of ethyl-chloroformiate. After the addition is complete, the whole is stirred and refluxed for 15 minutes. The reaction mixture is cooled, washed with water and the organic layer is separated, dried over magnesium sulfate, filtered and evaporated. The solid residue is recrystallized from 56 parts of 4-methyl-2-pentanone, to yield 2 - [(ethoxy - carbonyl) - imino] - 3-[(2 - thienyl - carbonyl) - methyl] - thiazoline; M.P. 178–179° C.

*Example VI*

A mixture of 10 parts of 2-imino-3-[(2-thienyl-carbonyl)-methyl]-thiazoline, 20 parts of propionic acid anhydride and 375 parts of chloroform is stirred and refluxed for 30 minutes. After cooling the reaction mixture, there is added ammonium hydroxide solution. The organic layer is separated, dried over magnesium sulfate, filtered and evaporated. The solid residue is recrystallized from 80 parts of 2-propanol, filtered off again and dried, yielding 2 - (propionyl - imino) - 3 - [(2 - thienyl-carbonyl)-methyl]-thiazoline; M.P. 137.5–138° C.

*Example VII*

To a solution of 18.2 parts of 2-imino-3-[(2-thienyl-carbonyl)-methyl]-thiazoline hydrobromide, 25 parts of triethylamine and 450 parts of chloroform are added portionwise 8.5 parts of butyroylchloride. After the addition is complete, the whole is stirred and refluxed for 30 minutes. After cooling, the reaction mixture is washed with water. The organic layer is separated, washed with ammonium hydroxide solution, dried over magnesium sulfate, filtered and evaporated. The oily residue is crystallized from 640 parts of dibutylether, the solid is filtered off and dried in vacuo, yielding crude 2-(butyroyl - imino) - 3- [(2 - thienyl - carbonyl) - methyl]-thiazoline. This fraction is recrystallized from 160 parts of dibutylether, to yield 2-(butyroyl-imino)-3-[(2-thienyl-carbonyl)-methyl]-thiazoline; M.P. 104–105° C.

*Example VIII*

To a solution of 18 parts of 2-imino-3-[(2-thienyl-carbonyl)-methyl]-thiazoline hydrobromide, 20 parts of triethylamine and 450 parts of chloroform are added portionwise 8.5 parts of cyclopropyl carboxylic acid chloride. After the addition is complete, the whole is stirred and refluxed for 30 minutes. After cooling the reaction mixture, the organic layer is separated, washed with water, dried over magnesium sulfate, filtered and evaporated. The solid residue is recrystallized from 48 parts of 4-methyl-2-pentanone, filtered off again and dried in vacuo, to yield crude 2-[(cyclopropyl-carbonyl)-imino]-3-[(2-thienyl - carbonyl) - methyl] - thiazoline. This fraction is alkalized with ammonium hydroxide solution and extracted with chloroform. The organic layer is separated, dried over magnesium sulfate, filtered and evaporated. The solid residue is recrystallized from 80 parts of toluene, filtered off again and dried in vacuo, to yield 2-[(cyclopropyl-carbonyl) - imino] - 3 - [(2 - thienyl-carbonyl)-methyl]-thiazoline; M.P. 158.5–160° C.

Example IX

To a stirred mixture of 13 parts of 2-(acetyl-imino)-3-[(2-thienyl-carbonyl)-methyl]-thiazoline hydrobromide and 64 parts of ethanol are added portionwise 3 parts of sodium tetrahydridoborate (exothermic reaction). After the addition is complete, the whole is stirred and refluxed for 1 hour. The solvent is evaporated. The solid residue is dissolved in hydrochloric acid 4 N. After keeping at room temperature, it crystallizes again. The solid is filtered off and dissolved in water. The aqueous solution is rendered alkaline with ammonium hydroxide and extracted with chloroform. The chloroform extract is dried over magnesium sulfate and evaporated. The solid residue is recrystallized twice: first from 4-methyl-2-pentanone and once more from 400 parts of water. After drying in vacuo, dl-2-(acetylimino)-3-[2-hydroxy-2-(2-thienyl)-ethyl]-thiazoline is obtained; M.P. 132.5–133° C.

Example X

To a suspension of 20 parts of 2-(acetyl-imino)-3-[(2-furyl-carbonyl)-methyl]-thiazoline in 160 parts of ethanol are added portionwise 3.1 parts of sodium tetrahydridoborate (exothermic reaction). After the addition is complete, the whole is stirred and refluxed for 1 hour. The solvent is evaporated. The solid residue is decomposed with diluted hydrochloric acid. The obtained solution is alkalized with ammonium hydroxide solution, whereupon a solid is formed. It is filtered off and recrystallized from 80 parts of toluene, yielding dl-2-(acetylimino)-3-[2-(2-furyl)-2-hydroxy-ethyl]-thiazoline; M.P. 115–116.5° C.

Example XI

To a stirred mixture of 6 parts of 2-(propionyl-imino)-3-[(2-thienyl-carbonyl)-methyl]-thiazoline, 40 parts of ethanol and 40 parts of methanol are added 0.95 part of sodium tetrahydridoborate. After the addition is complete, the whole is stirred and refluxed for one hour. The solvent is evaporated. The semi-solid residue is dissolved in diluted hydrochloric acid. This solution is alkalized with ammonium hydroxide, whereupon a solid precipitate is formed. It is filtered off and recrystallized from 48 parts of 2-propanol, filtered off again and dried, yielding dl-3-[2-hydroxy-2-(2-thienyl)-ethyl]-2-(propionyl-imino)-thiazoline; M.P. 141.5–143° C.

Example XII

To a solution of 14.5 parts of 2-[(ethoxy-carbonyl)-imino]-3-[(2-thienyl-carbonyl)-methyl]-thiazoline in 160 parts of methanol are added portionwise 3 parts of sodium tetrahydridoborate. After the addition is complete, the whole is stirred and refluxed for 30 minutes. After cooling, the solvent is evaporated. The solid residue is dissolved in diluted hydrochloric acid. This solution is alkalized with ammonium hydroxide solution, whereupon a solid precipitated. It is recrystallized from 78 parts 2-propanol, filtered off and dried in vacuo, yielding 2-[(ethoxy-carbonyl)-imino]-3-[2-hydroxy-2-(2-thienyl)-ethyl]-thiazoline; M.P. 152–154° C.

Example XIII

To a stirred solution of 7 parts of 2-(butyroyl-imino)-3-[(2-thienyl-carbonyl)-methyl]-thiazoline in 120 parts of methanol are added portionwise 1.15 parts of sodium tetrahydridoborate (exothermic reaction). After the addition is complete, the whole is stirred and refluxed for 30 minutes. After cooling, the solvent is evaporated. The residue is decomposed with hydrochloric acid, whereupon a precipitate is formed. The mixture is alkalized with ammonium hydroxide and extracted with chloroform. The organic layer is dried over magnesium sulfate, filtered and evaporated. The solid residue is recrystallized from a mixture of 40 parts dibutylether and 4 parts ethylacetate, filtered off again and dried in vacuo, to yield dl-2-(butyroylimino)-3-[2-hydroxy-2-(2-thienyl)-ethyl]-thiazoline; M.P. 106.5–107.5° C.

Example XIV

To a stirred solution of 8 parts of 2-[(cyclopropyl-carbonyl)-imino]-3-[(2-thienyl-carbonyl)-methyl]-thiazoline in 120 parts of methanol are added portionwise 1.15 parts of sodium tetrahydridoborate, at a temperature of about 50° C. After the addition is complete, the whole is stirred and refluxed for 30 minutes. After cooling, the solvent is evaporated. The solid residue is decomposed with diluted hydrochloric acid, whereupon a solid is precipitated. The mixture is alkalized with ammonium hydroxide and extracted with chloroform. The organic layer is separated, dried over magnesium sulfate, filtered and evaporated. The solid residue is recrystallized from 56 parts of 2-propanol, filtered again and dried in vacuo, to yield dl-2-[(cyclopropyl-carbonyl)-imino]-3-[2-hydroxy-2-(2-thienyl)-ethyl]-thiazoline; M.P. 152–153° C.

Example XV

A mixture of 2 parts of dl-2-(acetyl-imino)-3-[2-hydroxy-2-(2-thienyl)-ethyl]-thiazoline, 25 parts of acetic acid anhydride and a catalytic quantity of (4-methylphenyl)-sulfonic acid is stirred and refluxed for three hours. The excess of acetic acid anhydride is evaporated. The residue is taken up in water. This aqueous solution is rendered alkaline with ammonium hydroxide and extracted with toluene. The organic layer is dried over magnesium sulfate, filtered and evaporated. The residue is dissolved in diisopropylether and a few parts of toluene are added. The whole is boiled with activated charcoal, filtered again and kept at room temperature. The formed precipitate is filtered off, yielding a first fraction of crude dl-3-[2-acetoxy-2-(2-thienyl)-ethyl] - 2 - (acetyl-imino)-thiazoline. On further cooling of the mother liquor at 0° C., a second fraction of crude dl-3-[2-acetoxy-2-(2-thienyl)-ethyl]-2 - (acetyl - imino) - thiazoline is obtained. These combined fractions are recrystallized from 80 parts diisopropylether. The solid is filtered off and dried in vacuo, yielding pure dl-3-[2-acetoxy-2-(2-thienyl)-ethyl]-2-(acetyl - imino) - thiazoline; M.P. 122–122.5° C.

Example XVI

To a suspension of 5.15 parts of 2-imino-3-[(2-thienyl-carbonyl)-methyl]-thiazoline in 64 parts of ethanol are added 0.75 part of sodium tetrahydridoborate. The whole is stirred and refluxed for one hour. The solvent is evaporated. The solid residue is dissolved in diluted hydrochloric acid. This solution is alkalized with ammonium hydroxide and extracted with benzene. The organic layer is dried over magnesium sulfate, filtered and evaporated. The solid residue is recrystallized from 20 parts of 4-methyl-2-pentanone. After drying in vacuo, dl-3-[2-hydroxy-2-(2-thienyl)-ethyl]-2-imino-thiazoline is obtained; M.P. 100–101° C. Acetylation with acetic anhydride affords 2-(acetyl-imino)-3 - [2 - acetoxy - 2 - (2-thienyl)-ethyl]-thiazoline.

Various changes and modifications may be made in carrying out the present invention without departing from the spirit and scope thereof. Insofar as these changes and modifications are within the purview of the annexed claims, they are to be considered as part of this invention.

What is claimed is:

1. A compound selected from the group consisting of

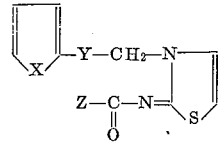

and the therapeutically active non-toxic acid addition salts thereof, wherein X is selected from the group consisting of oxygen and sulfur atoms; Y is selected from the group consisting of —CO—, —CH(OH)— and —CH(O—CO—lower alkyl)— radicals; and Z is selected from the group consisting of lower alkyl, cyclopropyl and lower alkoxy radicals.

2. A compound selected from the group consisting of

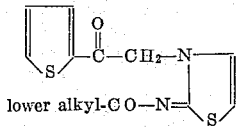

and the therapeutically active non-toxic acid addition salts thereof.

3. A compound selected from the group consisting of

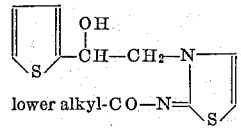

and the therapeutically active non-toxic acid addition salts thereof.

4. A compound selected from the group consisting of

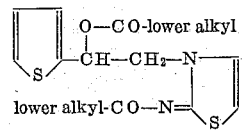

and the therapeutically active non-toxic acid addition salts thereof.

5. 2-(acetyl-imino)-3-[(2-thienyl-carbonyl) - methyl]-thiazoline.
6. 2-(acetyl-imino)-3-[(2 - furyl - carbonyl) - methyl]-thiazoline.
7. 2-[(ethoxy-carbonyl)-imino] - 3 - [(2 - thienyl - carbonyl)-methyl]-thiazoline.
8. 2 - (propionyl-imino) - 3 - [(2 - thienyl - carbonyl)-methyl]-thiazoline.
9. 2-(butyroyl-imino)-3-[(2-thienyl-carbonyl)-methyl]-thiazoline.
10. 2-[(cyclopropyl-carbonyl)-iminno]-3-[(2 - thienyl-carbonyl)-methyl]-thiazoline.
11. 2-(acetyl-imino)-3-[2-hydroxy-2-(2-thienyl)-ethyl]-thiazoline.
12. 2-(acetyl-imino)-3-[2-(2-furyl)-2-hydroxy - ethyl]-thiazoline.
13. 3-[2-hydroxy-2-(2-thienyl)-ethyl] - 2 - (propionyl-imino)-thiazoline.
14. 2 - [(ethoxy-carbonyl) - imino] - 3 - [2 - hydroxy-2-(2-thienyl)-ethyl]-thiazoline.
15. 2-(butyroyl-imino)-3-[2-hydroxy - 2 - (2-thienyl)-ethyl]-thiazoline.
16. 2-[(cyclopropyl-carbonyl)-imino] - 3 - [2-hydroxy-2-(2-thienyl)-ethyl]-thiazoline.
17. 2-(acetyl-imino) - 3 - [2 - acetoxy - 2 - (2 - thienyl)-ethyl]-thiazoline.

No references cited.

HENRY R. JILES, *Acting Primary Examiner.*
ALTON D. ROLLINS, *Assistant Examiner.*